US012417667B2

(12) United States Patent
Suzuki et al.

(10) Patent No.: US 12,417,667 B2
(45) Date of Patent: Sep. 16, 2025

(54) PAPER SHEET TRANSPORT DEVICE AND PAPER SHEET HANDLING DEVICE

(71) Applicant: JAPAN CASH MACHINE CO., LTD., Osaka (JP)

(72) Inventors: Hiroyuki Suzuki, Osaka (JP); Tuan Dung Le, Osaka (VN); Van Huong Nguyen, Osaka (VN)

(73) Assignee: JAPAN CASH MACHINE CO., LTD., Osaka (JP)

( * ) Notice: Subject to any disclaimer, the term of this patent is extended or adjusted under 35 U.S.C. 154(b) by 0 days.

(21) Appl. No.: 18/293,236

(22) PCT Filed: Jun. 7, 2022

(86) PCT No.: PCT/JP2022/022937
§ 371 (c)(1),
(2) Date: Jan. 29, 2024

(87) PCT Pub. No.: WO2023/013237
PCT Pub. Date: Feb. 9, 2023

(65) Prior Publication Data

US 2024/0331481 A1 Oct. 3, 2024

(30) Foreign Application Priority Data

Aug. 4, 2021 (JP) ................................ 2021-128137

(51) Int. Cl.
*G07D 11/16* (2019.01)
*G07D 11/14* (2019.01)
*G07D 11/22* (2019.01)

(52) U.S. Cl.
CPC ............ *G07D 11/16* (2019.01); *G07D 11/14* (2019.01); *G07D 11/22* (2019.01); *B65H 2701/1912* (2013.01)

(58) Field of Classification Search
CPC ........ G07D 11/16; G07D 11/14; G07D 11/22; B65H 2701/1912
See application file for complete search history.

(56) References Cited

U.S. PATENT DOCUMENTS

2010/0329507 A1 12/2010 Manabe
2014/0048379 A1 2/2014 Xu et al.
2021/0319643 A1* 10/2021 Baranowski ........... G07D 11/14

FOREIGN PATENT DOCUMENTS

CN 1598885 A 3/2005
CN 101933053 A 12/2010
(Continued)

OTHER PUBLICATIONS

WIPO, Japan Patent Office as International Search Authority, International Search Report (with English translation) and Written Opinion mailed Aug. 16, 2022 in International Patent Application No. PCT/JP2022/022937, 8 pages.
(Continued)

*Primary Examiner* — Jeremy R Severson
(74) *Attorney, Agent, or Firm* — MASUVALLEY & PARTNERS; Peter Martinez

(57) ABSTRACT

The present invention enables determination as to whether a banknote 100 is to be discharged even when only the feature quantity of a portion of the banknote is acquired at the time of discharging the banknote in a case in which a transport route length L1 from a reading position 18*a* of an optical recognition sensor 18 to an inlet/outlet 12 as a banknote discharge port is shorter than a total length LA of the banknote in a transport direction. At the time of discharging the banknote 100 already authenticated, a control unit 200 judges the type (denomination) of the banknote on the basis of a feature quantity of a reading target 103 that passes the optical recognition sensor 18 before a leading end 100*a* of (Continued)

the banknote 100 transported in a discharge direction protrudes to outside the device from the inlet/outlet 12.

12 Claims, 5 Drawing Sheets

(56) References Cited

FOREIGN PATENT DOCUMENTS

| | | | |
|---|---|---|---|
| EP | 1953709 | A1 | 8/2008 |
| EP | 2704108 | A1 | 3/2014 |
| JP | H01-209595 | A | 8/1989 |
| JP | 2007-094665 | A | 4/2007 |
| JP | 2009-251979 | A | 10/2009 |
| JP | 2018-136742 | A | 8/2018 |
| WO | WO 2016/092947 | A1 | 6/2016 |

OTHER PUBLICATIONS

European Patent Office, Extended European Search Report dated Jul. 16, 2025 in European Patent Application No. 22852665.3, 8 pages.

* cited by examiner

PAPER SHEET TRANSPORT DEVICE AND PAPER SHEET HANDLING DEVICE

RELATED APPLICATIONS

This application is the U.S. National Phase of and claims priority to International Patent Application No. PCT/JP2022/022937, International Filing Date Jun. 7, 2022, entitled Paper Sheet Transport Device And Paper Sheet Handling Device, which claims benefit of Japanese Application No. JP2021-128137 filed Aug. 4, 2021, both of which are incorporated herein by reference in their entireties.

FIELD

The present invention relates to a paper sheet transport device and a paper sheet handing device that transport paper sheets such as banknotes.

BACKGROUND

Patent Literature 1 describes a paper sheet handling device including a judgement/authentication unit that judges the denomination of a banknote, authenticity thereof, and whether the banknote is fit or unfit (whether the banknote is a fit note that is recirculatable or an unfit note that is not to be recirculated). The judgement/authentication unit includes a thickness detector and an optical detector along a transport route. The judgement/authentication unit performs judgement of the denomination of a banknote, authenticity thereof, and whether the banknote is fit or unfit on the basis of an output signal that is obtained at the time of passage of the banknote through each of the detectors. The banknote handling device changes the transport destination of a banknote having passed through the judgement/authentication unit according to a result of the judgement.

In Patent Literature 1, the transport destination of a banknote is changed after the judgement of the banknote is performed based on the output signal obtained from the entire banknote.

CITATION LIST

Patent Literature

Patent Literature 1: Japanese Patent Application Laid-open No. H1-209595

SUMMARY

Technical Problem

When a banknote is transported in the discharge direction in a device in which the transport route length from a detector to a banknote discharge port is shorter than the total length of the banknote in the transport direction, the leading end of the banknote protrudes from the banknote discharge port before the detector reads information of the entire banknote. When the leading end of a banknote protrudes from the banknote discharge port, the banknote is likely to be pulled out. Accordingly, it is undesirable to cancel discharge of the banknote after the leading end of the banknote protrudes from the banknote discharge port.

The present invention has been made in view of the above circumstances, and has an object to enable determination as to whether a paper sheet is to be discharged even when only the feature quantity of a portion of the paper sheet is acquired at the time of discharge of the paper sheet in a case in which the transport route length from a detector to the paper sheet discharge port is shorter than the total length of the paper sheet in the transport direction.

Solution to Problem

In order to achieve the above object, a paper sheet transport device according to the present invention comprises a paper sheet discharge port for discharging a paper sheet to outside the device, a recognition sensor that is arranged on a transport route for the paper sheet toward the paper sheet discharge port to read a feature quantity of the paper sheet transported on the transport route, and a paper sheet type judging unit that judges a type of the paper sheet on a basis of the read feature quantity of the paper sheet, wherein a transport route length from the paper sheet discharge port to the recognition sensor is configured to be shorter than a total length of the paper sheet in a transport direction, and the paper sheet type judging unit judges, at a time of discharging the paper sheet already authenticated, a type of the paper sheet on a basis of a feature quantity of a paper sheet portion passing the recognition sensor before a leading end of the paper sheet transported in a discharge direction protrudes to outside the device from the paper sheet discharge port.

Advantageous Effects of Invention

At the time of discharging a paper sheet, whether to discharge the paper sheet can be determined even when only the feature quantity of a portion of the paper sheet is acquired.

DESCRIPTION OF EMBODIMENTS

Figure 1:
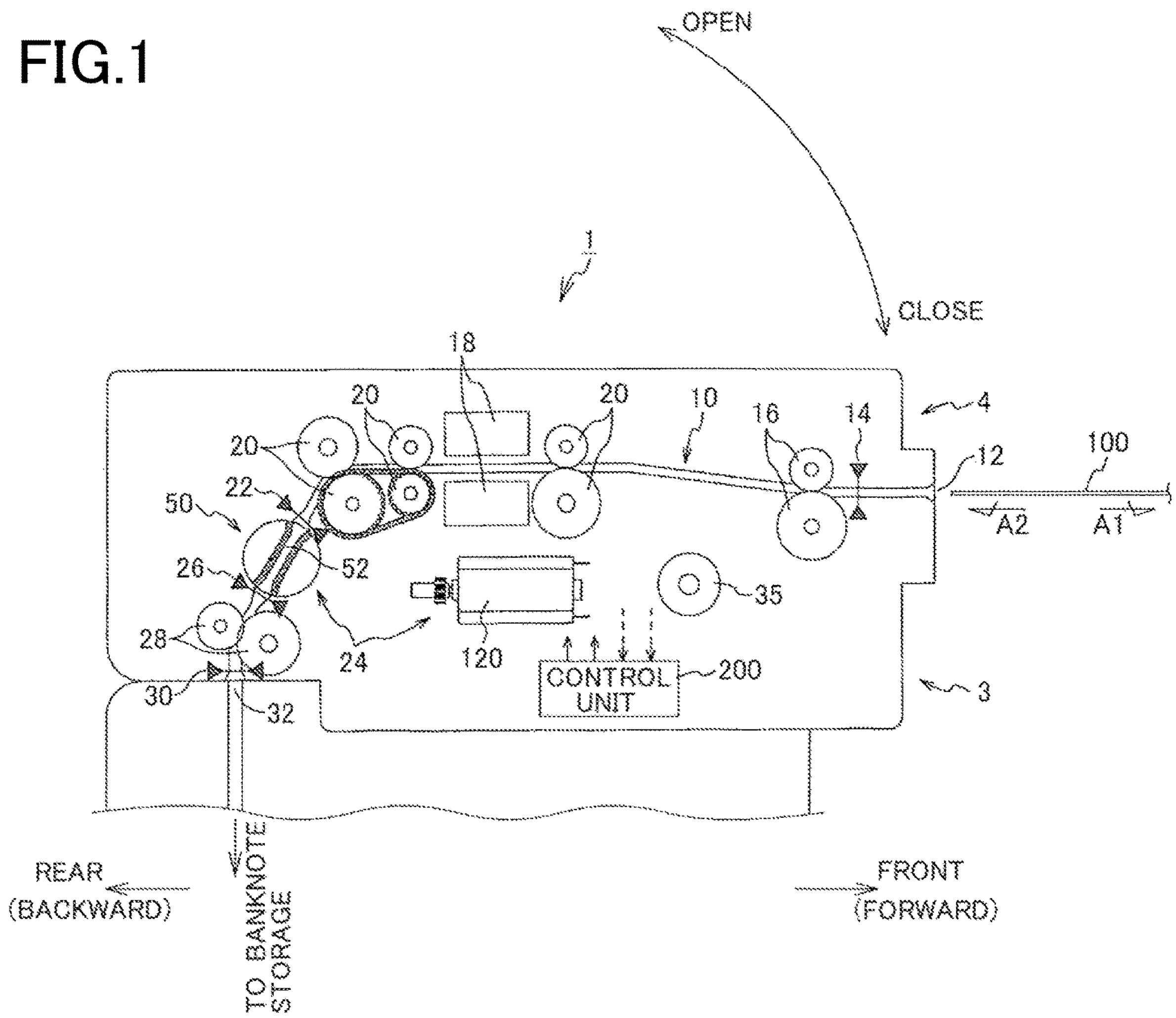
FIG. 1 is a vertical sectional view illustrating an internal configuration of an entire banknote transport device according to one embodiment of the present invention.

The present invention will be described below in detail with embodiments illustrated in the drawings. Constituent elements, types, combinations, shapes, and relative arrangements described in the following embodiments are merely explanatory examples, and are not intended to limit the scope of the present invention solely thereto unless otherwise specified.

First Embodiment

FIG. 1 is a vertical sectional view illustrating an internal configuration of the entire banknote transport device according to one embodiment of the present invention.

A banknote transport device (a paper sheet transport device) 1 according to one embodiment of the present invention includes an inlet/output (a paper sheet discharge port) 12 that discharges a banknote (a paper sheet) to outside the banknote transport device 1, an optical recognition sensor (a recognition sensor) 18 that is arranged on a transport route 10 for a banknote toward the inlet/outlet 12 to read a feature quantity of a banknote transported on the transport route 10, and a control unit (a paper sheet type judging unit) 200 that judges the type of a banknote on the basis of the read feature quantity of the banknote.

Figure 3:
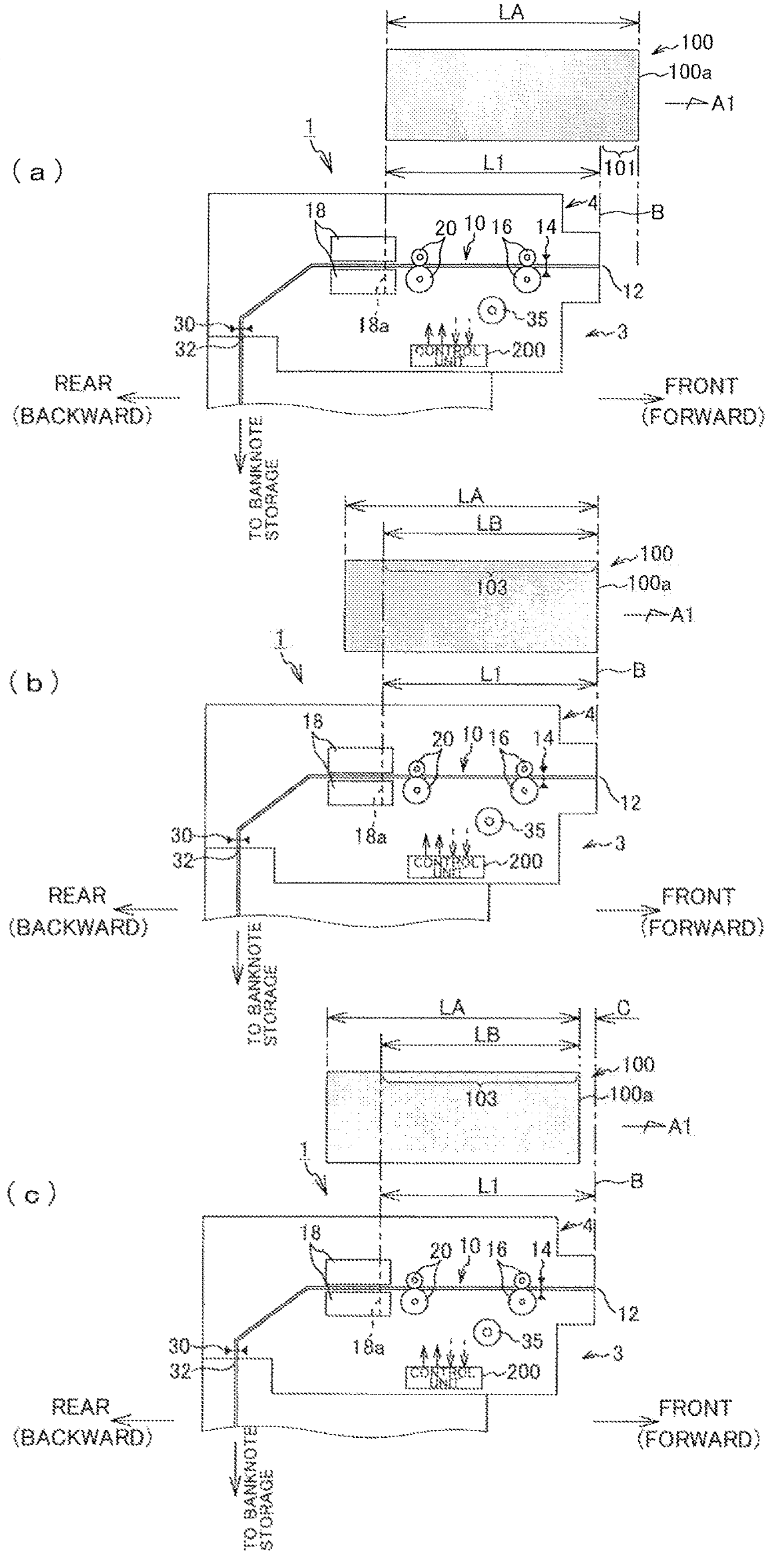
FIGS. 3(*a*) to 3(*c*) are schematic diagrams for explaining a relation between the internal configuration of the banknote transport device and a banknote being discharged.

As illustrated in FIG. 3(*b*), a transport route length L1 from the inlet/outlet 12 to the optical recognition sensor 18 in the banknote transport device 1 is configured to be shorter than a total length LA in the transport direction of a banknote 100 transported on the transport route 10.

In a dispense operation for the banknote 100, the control unit 200 judges the type (denomination) of a banknote on the basis of the feature quantity acquired from a banknote portion (a reading target 103) from a leading end 100*a* of the banknote 100 transported in the discharge direction (an arrow A1 direction in FIG. 1) to an intermediate part in the transport direction of the banknote 100. Specifically, the control unit 200 judges the type of the banknote 100 on the basis of the feature quantity of the banknote portion (the reading target 103) passing the optical recognition sensor 18 before the leading end 100*a* of the banknote 100 transported in the discharge direction protrudes outside the banknote transport device 1 from the inlet/outlet 12.

<Banknote Transport Device>

An internal configuration of the banknote transport device is explained with reference to FIG. 1. While a banknote is described as an example of a paper sheet in this example, the present device is also applicable to prevention of a fraudulent act in transport of a paper sheet other than a banknote, such as a security, a cash voucher, and a ticket.

The banknote transport device 1 is used in a state of being attached to the body of a banknote handling device (a paper sheet handling device body) such as a banknote deposit machine, various vending machines, and a money changer (all not illustrated), and a banknote received in the banknote transport device 1 is subjected to recognition of authenticity and denomination of the banknote by a recognition sensor, and is then sequentially stored one by one in a cashbox (a banknote storage) in the banknote handling device body. The banknote handling device (the paper sheet handing device) is configured to include the banknote handling device body and the banknote transport device 1.

The banknote transport device 1 includes a lower unit 3, and an upper unit 4 supported on the lower unit 3 to be capable of opening and closing, and the banknote transport route (transport route) 10 is formed between opposing surfaces of these units when the units are in a closed state illustrated in FIG. 1.

The inlet/outlet 12 for discharging the banknote 100 to the outside of the banknote transport device 1 or introducing the banknote 100 to the inside of the banknote transport device 1 is provided at one end of the transport route 10. Inside the inlet/outlet 12, an inlet/outlet tracking sensor 14 for detecting a banknote, an inlet/outlet roller pair 16, the optical recognition sensor 18 that reads information for recognizing the denomination and the authenticity of a banknote, a relay roller pair 20, a tracking sensor 22 on an one end side of a fraud prevention mechanism, a fraud prevention mechanism 24 including an opening/closing member 50 for fraud detection, a fraud preventing motor 120, and the like, a tracking sensor 26 on the other end side of the fraud prevention mechanism, a communication port roller pair 28, a communication port tracking sensor 30, and a communication port 32 are arranged along the transport route 10. A transport motor 35 that drives the roller pairs 16, 20, and 28 for transporting a banknote, and the control unit (a CPU, an MPU, a ROM, and a RAM) 200 that judges the denomination and the authenticity of a banknote on the basis of the recognition information from the optical recognition sensor 18 and that controls control targets such as the transport motor 35 on the basis of a banknote detection signal from each of the tracking sensors are also arranged.

The control unit 200 is constituted of a unit including a CPU (Central Processing Unit), a ROM (Read Only Memory), and a RAM (Random Access Memory), or is constituted of an MPU (Micro Processing Unit) including necessary modules as well as the CPU, the ROM, and the RAM assembled into one chip, or the like. A banknote discharged from the communication port 32 is stored in a banknote storage (a paper sheet storage or a stacker device, not illustrated). The above configuration of the banknote transport device 1 is merely an example and various modifications can be made. For example, the number of used motors, arrangement of the roller pairs, the type of the recognition sensor, and the like can be variously changed or selected.

Each of the roller pairs 16, 20, and 28 is constituted of a driving roller placed on the side of the lower unit 3 and a driven roller placed on the side of the upper unit 4, and includes a configuration of transporting a banknote while nipping both surfaces of the banknote. The optical recognition sensor 18 is, for example, a photocoupler that is constituted of a light-emitting element and a light-receiving element arranged to oppose across the transport route 10. The optical recognition sensor 18 having the above configuration can recognize an optical pattern (optical features) of a banknote by transmitting infrared light generated by the light-emitting element through the banknote and receiving the transmitted light. A magnetic sensor may be used as the recognition sensor. Alternatively, an image sensor (for example, a CIS; Contact Image Sensor) that recognizes an optical pattern of a banknote by receiving reflection light emitted from a light source and reflected by the banknote can be used as the recognition sensor.

<Functional Configuration>

Figure 2:
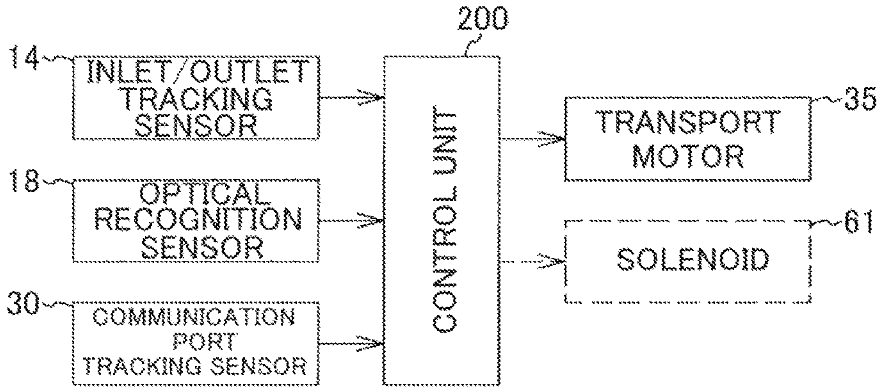
FIG. 2 is a block diagram of the banknote transport device illustrating a configuration related to control executed by a control unit.

FIG. 2 is a block diagram of the banknote transport device illustrating a configuration related to control executed by the control unit.

The inlet/outlet tracking sensor 14, the optical recognition sensor 18, and the communication port tracking sensor 30 are connected to input terminals of the control unit 200. The transport motor 35 is connected to an output terminal of the control unit 200.

The control unit 200 includes an authentication unit that receives an output of the optical recognition sensor 18 to judge whether a banknote is genuine, a banknote type judging unit (paper sheet type judging unit) that receives the output of the optical recognition sensor 18 to judge the type (denomination) of the banknote, and a driving control unit that controls driving of the transport motor 35. The authentication unit, the banknote type judging unit, and the driving control unit are realized by the CPU included in the control unit, which reads a program from the ROM to load the program into the RAM, and executes the program.

With reference to FIG. 1, when the banknote 100 received from the inlet/outlet 12 in an arrow A2 direction in FIG. 1 is judged as a genuine banknote, the control unit 200 executes control to continuously drive the transport motor 35 in a banknote receiving direction until the communication port tracking sensor 30 detects passage of a banknote, to transport the banknote to the banknote storage. When the banknote is not judged as a genuine banknote, the control unit 200 executes control to reversely rotate the transport motor 35 and continuously drive the transport motor 35 in a banknote discharge direction until the inlet/outlet tracking sensor 14 detects passage of the banknote, to return the banknote to the inlet/outlet 12.

When the banknote 100 received from the banknote storage through the communication port 32 is judged as a type of a banknote to be discharged from the inlet/outlet 12, the control unit 200 executes control to continuously drive the transport motor 35 in the banknote discharge direction until the inlet/outlet tracking sensor 14 detects passage of the banknote, to discharge the banknote from the inlet/output 12. When the banknote is not judged as a type of a banknote to be discharged from the inlet/outlet 12, the control unit 200 executes control to reversely rotate the transport motor 35 and continuously drive the transport motor 35 in the banknote receiving direction until the communication port tracking sensor 30 detects passage of the banknote, to transport the banknote to the banknote storage.

<Processing of Banknote being Discharged>

Figure 4:
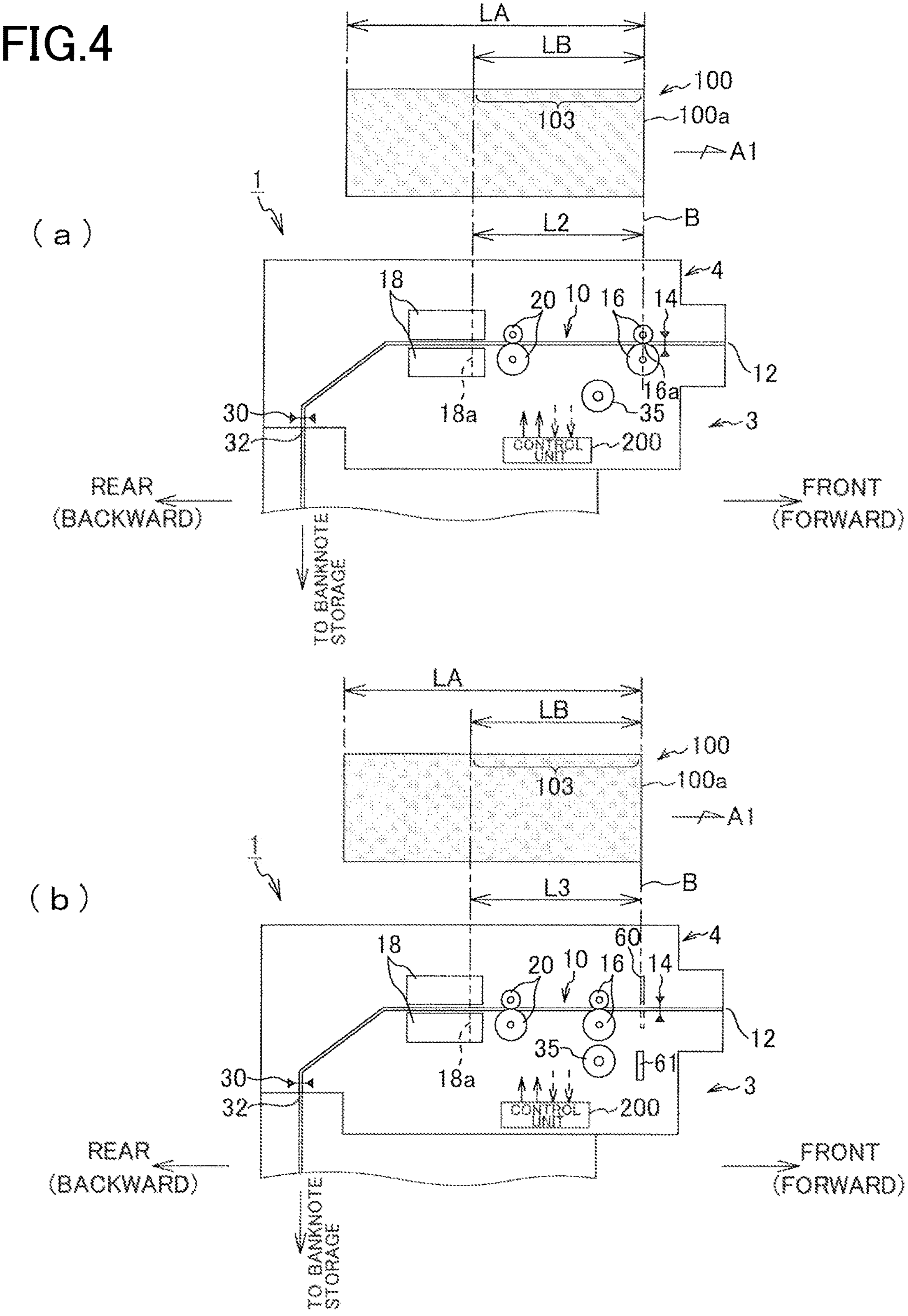
FIGS. 4(*a*) and 4(*b*) are schematic diagrams for explaining a relation between the internal configuration of the banknote transport device and a banknote being discharged.

FIGS. 3(*a*) to 3(*c*) and FIGS. 4(*a*) and 4(*b*) are schematic diagrams for explaining a relation between the internal configuration of the banknote transport device and a banknote being discharged. In the present example, the banknote 100 is transported in a direction along the long edge direction.

As illustrated in the drawings, in the banknote transport device 1, the transport route length L1 from the optical recognition sensor 18 to the inlet/outlet 12 is shorter than the total length LA of the banknote 100 in the transport direction. More precisely, the transport route length L1 is the length of the transport route 10 from a reading position 18*a* where the optical recognition sensor 18 reads information of a banknote to the inlet/outlet 12.

As illustrated in FIG. 3(*a*), at the time of discharging the banknote 100, a leading end portion 101 of the banknote 100 protrudes to the outside of the banknote transport device 1 from the inlet/outlet 12 before the optical recognition sensor 18 reads information of the total length LA of the banknote 100 in the transport direction. When the leading end portion 101 of the banknote 100 is protruded to the outside of the banknote transport device 1 from the inlet/outlet 12, the banknote can be easily pulled out only by pinching the leading end portion 101 with fingers or the like. Therefore, even when the banknote 100 is a type of a banknote that is not a discharge target, it is undesirable to cancel discharge processing of the banknote 100 after the leading end portion 101 of the banknote 100 is protruded to the outside of the banknote transport device 1 from the inlet/outlet 12.

Therefore, in the present embodiment, a boundary position where easiness of pulling out a banknote transported in the discharge direction greatly changes is set as a discharge cancellation line B. When the banknote 100 is not a discharge target, the control unit 200 executes control to cancel the discharge processing of the banknote 100 before the leading end 100*a* of the banknote 100 reaches the discharge cancellation line B.

FIG. 3(*b*) is an example where the inlet/outlet 12 is the discharge cancellation line B. In this example, a transport direction length LB of a portion (the reading target 103) of the banknote 100 that can be read by the optical recognition sensor 18 before the banknote 100 reaches the discharge cancellation line B is set to be equal to or shorter than the transport route length L1 from the optical recognition sensor 18 to the inlet/outlet 12. The reading target 103 is a portion including information related to a feature quantity that enables judgement of the type of the banknote 100. The optical recognition sensor 18 is arranged at a position where the information of the total length LB of the reading target 103 in the transport direction can be read before the leading end 100*a* of the banknote 100 reaches the inlet/outlet 12.

The control unit 200 judges whether the banknote 100 is a banknote to be discharged on the basis of the feature quantity of a portion (the reading target 103) of the banknote 100 having passed the optical recognition sensor 18 before the leading end 100*a* of the banknote 100 transported in the discharge direction protrudes to the outside of the banknote transport device 1 from the inlet/outlet 12.

The banknote 100 being discharged is a banknote stored in the banknote storage and has been authenticated at the time of storage into the banknote storage. That is, a banknote fed from the banknote storage is guaranteed to be a genuine banknote. Therefore, authentication of a banknote can be omitted when the banknote is discharged from the banknote storage. Information of the entire banknote is required to authenticate a banknote. On the other hand, the type (denomination) of a banknote can be judged with information of a portion of the banknote. About a half to a third of the total length LA of the banknote 100 in the transport direction is enough for the length LB of the reading target 103 in the transport direction.

Accordingly, at the time of discharging the banknote 100 fed from the banknote storage, the banknote transport device 1 according to the present embodiment judges only the type of the banknote on the basis of information read from a portion (the reading target 103) of the banknote 100 on the leading end side in the transport direction, and discharges the banknote 100 from the inlet/outlet 12 when the banknote is judged as a type of a banknote to be discharged.

As illustrated in FIG. 3(*c*), it is desirable that the range (the transport direction length LB) of the reading target 103 is set in such a manner that the leading end 100*a* of the banknote 100 does not go beyond the discharge cancellation line B also with a length (a portion indicated by C in FIG. 3(*c*)) of the banknote 100 transported after the optical recognition sensor 18 reads the reading target 103 (after a back end 103*b* of the reading target 103 passes the optical recognition sensor 18) and before the transport motor 35 is stopped or reversely rotated. With such setting, there is no need to stop the transport motor 35 when the discharge processing is not cancelled, and the discharge processing can be efficiently performed.

FIG. 4(*a*) is an example in which a nipping part 16*a* of the inlet/outlet roller pair 16 arranged nearby the inlet/outlet 12 is the discharge cancellation line B. In this example, the transport direction length LB of the reading target 103 is set to be equal to or shorter than a transport route length L2 from the optical recognition sensor 18 to the nipping part 16*a*.

The control unit 200 judges whether the banknote 100 is a banknote to be discharged on the basis of the feature quantity of a portion (the reading target 103) of the banknote 100 having passed the optical recognition sensor 18 before the leading end 100*a* of the banknote 100 transported in the discharge direction reaches the nipping part 16*a*.

Each of rollers constituting the inlet/outlet roller pair 16 protrudes into the transport route 10 to press against the other roller of the pair. Therefore, it is difficult to pinch the banknote 100 located on the inner side of the banknote transport device 1 than the nipping part 16*a* with fingers or the like and take out the banknote 100. That is, the nipping part 16*a* of the inlet/outlet roller pair 16 can function as extraction resisting means that provides resistance force against extraction of the banknote 100 from the inlet/outlet 12, or extraction blocking means that blocks extraction of the banknote.

The banknote transport device 1 illustrated in FIG. 4(*b*) includes a shutter unit 60 that opens and closes the transport route 10, on the transport route 10. The shutter unit 60 is arranged at a position on the inner side of the banknote transport device 1 than the inlet/outlet tracking sensor 14 and nearby the inlet/outlet tracking sensor 14. The shutter unit 60 moves between a position (a position indicated by a solid line in FIG. 4(*b*)) to open the transport route 10 toward the inlet/outlet 12 and a position (a position indicated by a broken line in FIG. 4(*b*)) to close the transport route 10. When at the closed position, the shutter unit 60 functions an extraction blocking means that blocks extraction of the banknote 100 from the inlet/outlet 12.

As illustrated in FIG. 2, for example, a solenoid 61 is connected to an output terminal of the control unit 200 as driving means that drives the shutter unit 60 to be opened and closed. The control unit 200 controls the solenoid 61 to move the shutter unit 60 to the opened position or the closed position according to a transported state, a transported position, or the like of the banknote 100.

FIG. 4(*b*) is an example in which the shutter unit 60 is the discharge cancellation line B. In this example, the transport direction length LB of the reading target 103 is set to be equal to or shorter than a transport route length L3 from the optical recognition sensor 18 to the shutter unit 60.

The control unit 200 judges whether the banknote 100 is a banknote to be discharged on the basis of the feature quantity of a portion (the reading target 103) of the banknote 100 having passed the optical recognition sensor 18 before the leading end 100*a* of the banknote 100 transported in the discharge direction reaches the shutter unit 60.

The shutter unit 60 may be a switching device (a switching gate) that sets the transport destination of the banknote 100 to the inlet/outlet 12 or sets the transport destination of the banknote 100 to a branch route branching from the transport route 10. In this case, when the switching device sets the transport destination of the banknote 100 to the branch route, the transport route 10 toward the inlet/outlet 12 is closed.

<Depositing Flow>

Figure 5:
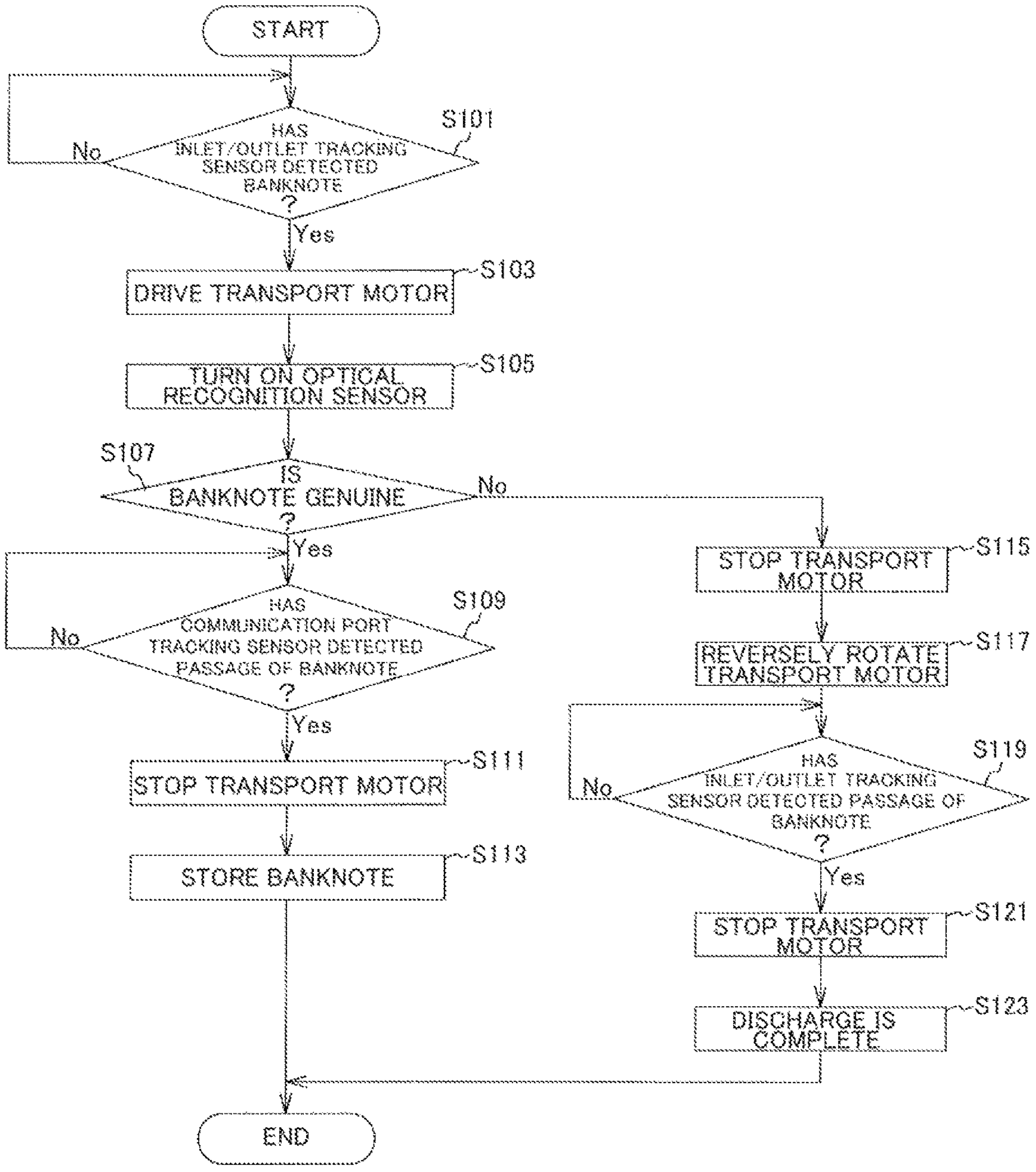
FIG. 5 is a flowchart illustrating an operation at the time of banknote deposit.

An operation in a case in which the banknote transport device 1 functions as a deposit device that introduces the banknote 100 into the device is explained with reference to a flowchart. FIG. 5 is a flowchart illustrating an operation at the time of banknote deposit.

At Step S101, the control unit 200 waits to detect whether a banknote is input to the inlet/outlet 12. When a banknote is input to the inlet/outlet 12 provided at one end of the transport route 10, the inlet/outlet tracking sensor 14 detects insertion of the banknote 100 and sends a detection signal to the control unit 200.

At Step S103, the control unit 200 drives the transport motor 35 to transport the banknote along the transport route 10.

At Step S105, the control unit 200 turns on the optical recognition sensor 18. The optical recognition sensor 18 reads an optical pattern (optical features) related to the transport direction total length LA of the banknote 100 being transported. The optical recognition sensor 18 sends the read recognition information to the control unit 200.

The control unit 200 as the authentication unit receives an output signal of the optical recognition sensor 18, and authenticates the banknote as to whether the banknote being transported is a genuine banknote on the basis of feature quantity data (Step 107). The control unit 200 as the paper sheet type judging unit judges the denomination of the banknote being transported on the basis of the feature quantity data.

When judging that the banknote being transported is a genuine banknote (YES at Step S107), the control unit 200 judges whether the communication port tracking sensor 30 has detected passage of a banknote at Step S109.

When the communication port tracking sensor 30 has detected passage of a banknote (YES at Step S109), the control unit 200 stops the transport motor 35 at Step S111.

When the banknote is stored in the banknote storage at Step S113, a series of processes ends.

On the other hand, at Step S107, when the control unit 200 does not judge that the banknote being transported is a genuine banknote (NO at Step S107), the control unit 200 stops the transport motor 53 and reversely rotates the transport motor 53 (Steps S115 and S117) to return the banknote to the inlet/outlet 12.

When the inlet/outlet tracking sensor 14 has detected passage of a banknote at Step S119 (YES at Step 119), the control unit 200 stops driving of the transport motor 35 (Step S121). When discharge of the banknote is complete (Step 123), a series of processes ends.

<Dispensing Flow>

Figure 6:
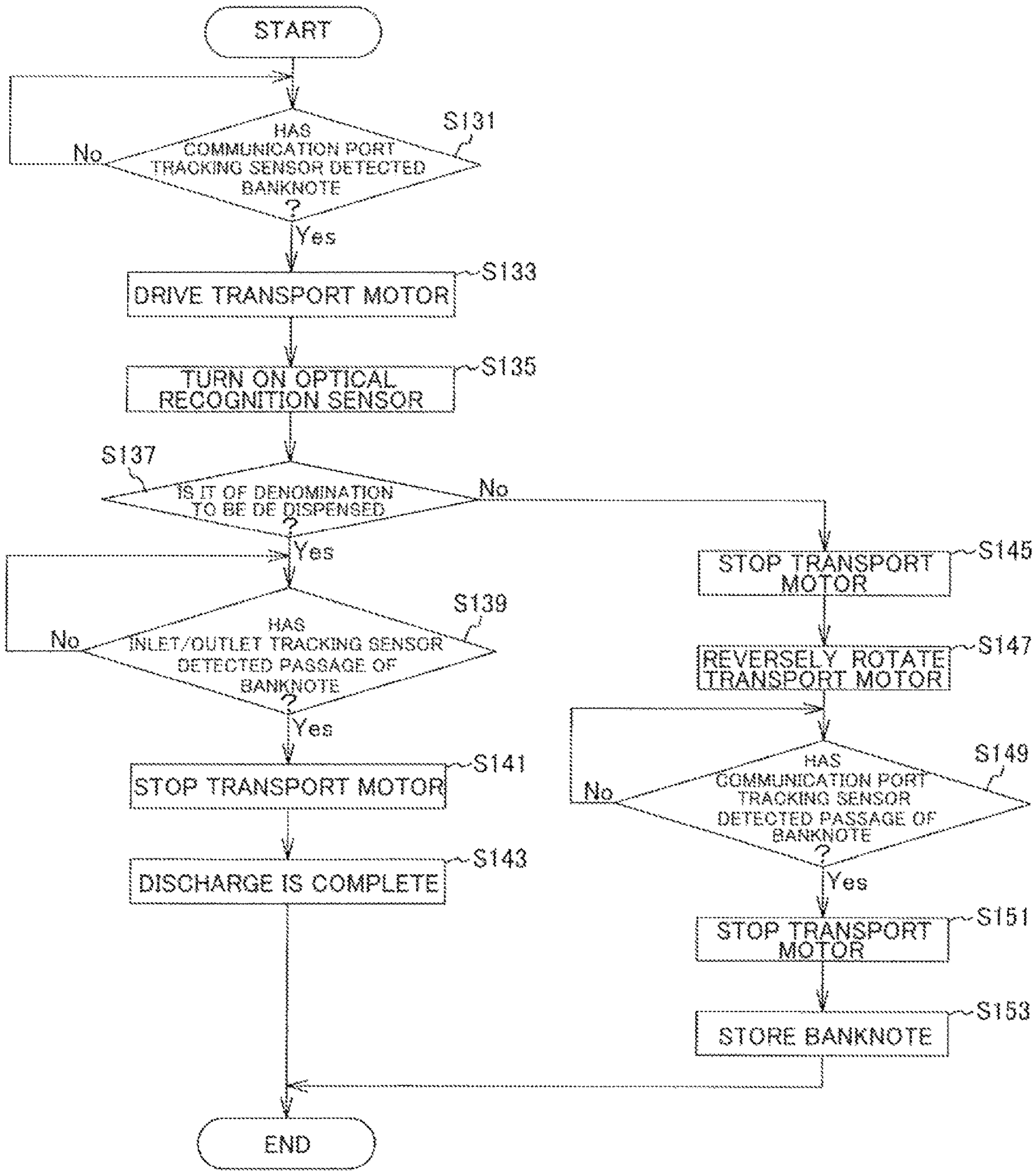
FIG. 6 is a flowchart illustrating an operation at the time of banknote discharge.

An operation in a case in which the banknote transport device 1 discharges a banknote is explained with reference to a flowchart. FIG. 6 is a flowchart illustrating an operation at the time of banknote discharge.

At Step S131, the control unit 200 waits to detect whether a banknote is transported from the banknote storage. When a banknote is inserted to the communication port 32 provided at the other end of the transport route 10, the communication port tracking sensor 30 detects insertion of the banknote 100 and sends a detection signal to the control unit 200.

At Step 133, the control unit 200 drives the transport motor 35 to transport the banknote along the transport route 10.

At Step S135, the control unit 200 turns on the optical recognition sensor 18. The optical recognition sensor 18 reads an optical pattern (optical features) associated with the reading target 103 of the banknote 100 being transported. The optical recognition sensor 18 sends the read recognition information to the control unit 200.

The control unit 200 acquires information related to the type of the banknote discharged from the banknote storage, from control means that controls the banknote storage, or the like. The control unit 200 receives an output signal from the optical recognition sensor 18, and judges whether the banknote being transported is a type of a banknote to be discharged on the basis of the feature quantity data, that is, whether the feature quantity data matches the information related to the type of the banknote acquired from the control means that controls the banknote storage, or the like (Step 137).

Banknotes stored in the banknote storage have been already authenticated in accordance with the flow at the time of banknote introduction (FIG. 5). The control unit 200 does not authenticate the banknote being transported on the premise that banknotes transported at the time of banknote discharge are genuine banknotes.

When the control unit 200 judges that the banknote being transported is a type of a banknote to be discharged (YES at Step S137), the control unit 200 judges whether the inlet/outlet tracking sensor 14 has detected passage of a banknote at Step S139.

When the inlet/outlet tracking sensor 14 has detected passage of the banknote (YES at Step S139), the control unit 200 stops the transport motor 35 at Step S141.

When the banknote is discharged from the banknote transport device 1 at Step S143, a series of processes ends.

On the other hand, at Step S137, when the control unit 200 does not judge that the banknote being transported is a type of a banknote to be discharged (NO at Step S137), the control unit 200 stops the transport motor 53 (Step S145). The banknote 100 is stopped before reaching the discharge cancellation line B.

At Step S147, the control unit 200 reversely rotates the transport motor 35 to transport the banknote to the banknote storage.

When the communication port tracking sensor 30 has detected passage of a banknote at Step S149 (YES at Step S149), the control unit 200 stops driving the transport motor 35 (Step S151).

When restorage of the banknote is complete (Step 153), a series of processes ends.

<Modification>

While the banknote transport device 1 in the present embodiment is a device that performs introduction of a banknote into the device and discharge of a banknote to the outside of the device, the banknote transport device 1 may be a device that performs only discharge of a banknote to the outside of the device. In this case, it is assumed that banknotes stored in the banknote storage have been authenticated by some method at the time of storage into the banknote storage and that a banknote being discharged is guaranteed to be a genuine banknote from this point of view.

While the banknote transport device 1 transports the banknote 100 along the long edge direction in the present example, the banknote 100 may be transported along the short edge direction.

The optical recognition sensor 18 is arranged at a position where the sensor can judge each of plural types of banknotes that are supposed to be handled by the banknote handling device 1 at the time of discharge of the banknote.

<Effect>

According to the present embodiment, at the time of discharge of a banknote, whether the banknote is a banknote to be discharged is judged based on the feature quantity of a portion of the banknote on the leading end side in the transport direction. Since the transport direction length of a reading target used in the judgement of the banknote type is shorter than the total length of the banknote in the transport direction, the optical recognition sensor can be arranged close to the inlet/outlet. Therefore, the banknote transport device can be downsized.

The amount of the feature quantity data used to judge the banknote type is smaller than that of the feature quantity data acquired from the entire banknote. Accordingly, the judging processing can be speeded up.

SUMMARY OF ACTIONS AND EFFECTS OF ASPECTS OF PRESENT INVENTION

First Aspect

The present aspect is a paper sheet transport device (a banknote transport device 1) including a paper sheet discharge port (an inlet/outlet 12) for discharging a paper sheet (a banknote 100) to outside the device, a recognition sensor (an optical recognition sensor 18) that is arranged on a transport route 10 for the paper sheet toward the paper sheet discharge port to read a feature quantity of the paper sheet transported on the transport route, and a paper sheet type judging unit (a control unit 200) that judges a type of the paper sheet on the basis of the read feature quantity of the paper sheet.

In the paper sheet transport device, a transport route length L1 from the paper sheet discharge port to the recognition sensor is configured to be shorter than a total length LA of the paper sheet in a transport direction, and the paper sheet type judging unit judges, at a time of discharging the paper sheet already authenticated, a type of the paper sheet on the basis of a feature quantity of a paper sheet portion (a reading target 103) passing the recognition sensor before a leading end 100*a* of the paper sheet transported in a discharge direction protrudes to outside the device from the paper sheet discharge port. The paper sheet is transported from, for example, a paper sheet storage that stores paper sheets already authenticated.

According to the present aspect, even when only the feature quantity of a portion of a paper sheet is acquired at a time of discharging the paper sheet, whether to discharge the paper sheet can be determined. That is, the type of a paper sheet can be judged when the feature quantity of a portion of the paper sheet, in this aspect, particularly the feature quantity of a portion of the paper sheet on the leading end side in the transport direction is acquired. Therefore, whether a paper sheet is a type of a paper sheet to be discharged can be judged with the feature quantity of a portion of the paper sheet.

In the present aspect, the transport direction length of a paper sheet portion (a reading target) used to judge the type of the paper sheet is shorter than the total length of the paper sheet in the transport direction. Accordingly, the recognition sensor can be arranged close to the paper sheet discharge port. Therefore, the paper sheet transport device can be downsized.

The amount of the feature quantity data used to judge the type of a paper sheet is smaller than that of the feature quantity data acquired from the entire paper sheet. Accordingly, the judging processing of the paper sheet type can be speeded up.

As for a paper sheet being discharged from the paper sheet transport device, when the paper sheet is authenticated at the time of receiving the paper sheet into a paper sheet storage arranged in the back of the paper sheet transport device, the paper sheet is guaranteed to be a genuine paper sheet without authentication of the paper sheet being discharged. In this case, authentication of a paper sheet at the time of discharging the paper sheet can be omitted.

The paper sheet transport device may include a function to transport a paper sheet introduced from outside the device to a paper sheet storage arranged in the back of the paper sheet transport device.

Second Aspect

The present aspect is a paper sheet transport device (a banknote transport device 1) including a paper sheet discharge port (an inlet/outlet 12) for discharging a paper sheet (a banknote 100) to outside the device, a recognition sensor (an optical recognition sensor 18) that is arranged on a transport route 10 for the paper sheet toward the paper sheet discharge port to read a feature quantity of the paper sheet transported on the transport route, and a paper sheet type judging unit (a control unit 200) that judges a type of the paper sheet on the basis of the read feature quantity of the paper sheet.

The paper sheet transport device includes a discharge roller pair (an inlet/outlet roller pair 16) for banknote transport, that is arranged nearby the paper sheet discharge port, a transport route length L2 from the discharge roller pair to the recognition sensor is configured to be shorter than a total length LA of the paper sheet in a transport direction, and the paper sheet type judging unit judges, at a time of discharging the paper sheet already authenticated, a type of the paper sheet on the basis of a feature quantity of a paper sheet portion (a reading target 103) passing the recognition sensor before a leading end 100*a* of the paper sheet transported in a discharge direction reaches a nipping part 16*a* of the discharge roller pair. The paper sheet is transported from, for example, a paper sheet storage that stores paper sheets already authenticated.

According to the present aspect, identical effects as those of the first aspect can be attained.

Third Aspect

The present aspect is a paper sheet transport device (a banknote transport device 1) including a paper sheet discharge port (an inlet/outlet 12) for discharging a paper sheet (a banknote 100) to outside the device, a recognition sensor (an optical recognition sensor 18) that is arranged on a transport route 10 for the paper sheet toward the paper sheet discharge port to read a feature quantity of the paper sheet transported on the transport route, and a paper sheet type judging unit (a control unit 200) that judges a type of the paper sheet on the basis of the read feature quantity of the paper sheet.

The paper sheet transport device includes a shutter unit 60 that is arranged nearby the paper sheet discharge port and moves between a position to open the transport route and a position to close the transport route, a transport route length L3 from the shutter unit to the recognition sensor is configured to be shorter than a total length LA of the paper sheet in a transport direction, and the paper sheet type judging unit judges, at a time of discharging the paper sheet already authenticated, a type of the paper sheet on the basis of a feature quantity of a paper sheet portion (a reading target 103) passing the recognition sensor before a leading end 100*a* of the paper sheet transported in a discharge direction reaches the shutter unit. The paper sheet is transported from, for example, a paper sheet storage that stores paper sheets already authenticated.

According to the present aspect, identical effects as those of the first aspect can be attained.

Fourth Aspect

In the paper sheet transport device (the banknote transport device 1) according to the present aspect, the paper sheet discharge port (the inlet/outlet 12) is a paper sheet inlet/outlet for discharging the paper sheet (the banknote 100) to outside the device and receiving the paper sheet into the device, the device includes an authentication unit (a control unit 200) that authenticates the paper sheet on the basis of the feature quantity of the paper sheet read by the recognition sensor (the optical recognition sensor 18), and the authentication unit authenticates the paper sheet at the time of receiving the paper sheet into the device from the paper sheet inlet/outlet, on the basis of the feature quantity of the paper sheet read by the recognition sensor.

At the time of receiving a paper sheet from the paper sheet inlet/outlet, the paper sheet transport device authenticates the paper sheet. The paper sheet transport device transports a paper sheet introduced from the paper sheet inlet/outlet to a paper sheet storage that is arranged in the back of the paper sheet transport device. Therefore, at the time when a paper sheet transported from the paper sheet storage is discharged from the paper sheet inlet/outlet, authenticity of the paper sheet is guaranteed even when authentication of a paper sheet is omitted.

Fifth Aspect

The present aspect is a paper sheet handling device including the paper sheet transport device (the banknote transport device 1) according to any one of the first to fourth aspects.

According to the present aspect, identical effects as those of the first to fourth aspects can be attained.

REFERENCE SIGNS LIST

L1 to L3 transport route length, LA total length in transport direction of banknote, LB transport direction length of reading target of banknote, 1 banknote transport device, 3 lower unit, 4 upper unit, 10 transport route, 12 inlet/outlet, 14 inlet/outlet tracking sensor, 16 inlet/outlet roller pair, 16*a* nipping part, 18 optical recognition sensor, 18*a* light-emitting element, 20 relay roller pair, 22 tracking sensor, 24 fraud prevention mechanism, 26 tracking sensor, 28 communication port roller pair, 30 communication port tracking sensor, 32 communication port, 35 transport motor, 50 opening/closing member, 53 transport motor, 60 shutter unit, 61 solenoid, 100 banknote, 100*a* leading end, 101 leading end portion, 103 reading target, 103*b* back end, 120 fraud preventing motor, 200 control unit.

The invention claimed is:

1. A paper sheet transport device comprising a paper sheet discharge port for discharging a paper sheet to outside the device, a recognition sensor that is arranged on a transport route for the paper sheet toward the paper sheet discharge port to read a feature quantity of the paper sheet transported on the transport route, and a paper sheet type judging unit that judges a type of the paper sheet on a basis of the read feature quantity of the paper sheet, wherein a transport route length from the paper sheet discharge port to the recognition sensor is configured to be shorter than a total length of the paper sheet in a transport direction, and the paper sheet type judging unit judges, at a time of discharging the paper sheet already authenticated, a type of the paper sheet on a basis of a feature quantity of a paper sheet portion passing the recognition sensor before a leading end of the paper sheet transported in a discharge direction protrudes to outside the device from the paper sheet discharge port.

2. The paper sheet transport device according to claim 1, wherein the paper sheet discharge port is a paper sheet inlet/outlet for discharging the paper sheet to outside the device and receiving the paper sheet into the device, the device includes an authentication unit that authenticates the paper sheet on a basis of the feature quantity of the paper sheet read by the recognition sensor, and the authentication unit authenticates the paper sheet at a time of receiving the paper sheet into the device from the paper sheet inlet/outlet, on a basis of the feature quantity of the paper sheet read by the recognition sensor.

3. A paper sheet handling device comprising the paper sheet transport device according to claim 2.

4. A paper sheet handling device comprising the paper sheet transport device according to claim 1.

5. A paper sheet transport device comprising a paper sheet discharge port for discharging a paper sheet to outside the device, a recognition sensor that is arranged on a transport route for the paper sheet toward the paper sheet discharge port to read a feature quantity of the paper sheet transported on the transport route, and a paper sheet type judging unit that judges a type of the paper sheet on a basis of the read feature quantity of the paper sheet, the device comprising a discharge roller pair for banknote transport, that is arranged nearby the paper sheet discharge port, wherein a transport route length from the discharge roller pair to the recognition sensor is configured to be shorter than a total length of the paper sheet in a transport direction, and the paper sheet type judging unit judges, at a time of discharging the paper sheet already authenticated, a type of the paper sheet on a basis of a feature quantity of a paper sheet portion passing the recognition sensor before a leading end of the paper sheet transported in a discharge direction reaches a nipping part of the discharge roller pair.

6. The paper sheet transport device according to claim 5, wherein the paper sheet discharge port is a paper sheet inlet/outlet for discharging the paper sheet to outside the device and receiving the paper sheet into the device, the device includes an authentication unit that authenticates the paper sheet on a basis of the feature quantity of the paper sheet read by the recognition sensor, and the authentication unit authenticates the paper sheet at a time of receiving the paper sheet into the device from the paper sheet inlet/outlet, on a basis of the feature quantity of the paper sheet read by the recognition sensor.

7. A paper sheet handling device comprising the paper sheet transport device according to claim 6.

8. A paper sheet handling device comprising the paper sheet transport device according to claim 5.

9. A paper sheet transport device comprising a paper sheet discharge port for discharging a paper sheet to outside the device, a recognition sensor that is arranged on a transport route for the paper sheet toward the paper sheet discharge port to read a feature quantity of the paper sheet transported on the transport route, and a paper sheet type judging unit that judges a type of the paper sheet on a basis of the read feature quantity of the paper sheet, the device comprising a shutter unit that is arranged nearby the paper sheet discharge port and moves between a position to open the transport route and a position to close the transport route, wherein a transport route length from the shutter unit to the recognition sensor is configured to be shorter than a total length of the paper sheet in a transport direction, and the paper sheet type judging unit judges, at a time of discharging the paper sheet already authenticated, a type of the paper sheet on a basis of a feature quantity of a paper sheet portion passing the recognition sensor before a leading end of the paper sheet transported in a discharge direction reaches the shutter unit.

10. The paper sheet transport device according to claim 9, wherein the paper sheet discharge port is a paper sheet inlet/outlet for discharging the paper sheet to outside the device and receiving the paper sheet into the device, the device includes an authentication unit that authenticates the paper sheet on a basis of the feature quantity of the paper sheet read by the recognition sensor, and the authentication unit authenticates the paper sheet at a time of receiving the paper sheet into the device from the paper sheet inlet/outlet, on a basis of the feature quantity of the paper sheet read by the recognition sensor.

11. A paper sheet handling device comprising the paper sheet transport device according to claim 10.

12. A paper sheet handling device comprising the paper sheet transport device according to claim 9.

* * * * *